(12) United States Patent
Byun (10) Patent No.: US 8,160,363 B2
(45) Date of Patent: Apr. 17, 2012

(54) DEVICE AND METHOD FOR INPUTTING CHARACTERS OR DRAWINGS IN A MOBILE TERMINAL USING A VIRTUAL SCREEN

(75) Inventor: Joon-Ho Byun, Seoul (KR)

(73) Assignee: Samsung Electronics Co., Ltd (KR)

( * ) Notice: Subject to any disclaimer, the term of this patent is extended or adjusted under 35 U.S.C. 154(b) by 829 days.

(21) Appl. No.: 11/071,543

(22) Filed: Mar. 3, 2005

(65) Prior Publication Data

US 2006/0077188 A1  Apr. 13, 2006

(30) Foreign Application Priority Data

Sep. 25, 2004 (KR) .................. 10-2004-0077550

(51) Int. Cl.
*G06K 9/00* (2006.01)
(52) U.S. Cl. ............... 382/188; 345/158; 345/179
(58) Field of Classification Search .................. None
See application file for complete search history.

(56) References Cited

U.S. PATENT DOCUMENTS

| | | | | | |
|---|---|---|---|---|---|
| 5,544,260 | A | * | 8/1996 | Chefalas et al. | 382/187 |
| 5,594,810 | A | * | 1/1997 | Gourdol | 382/187 |
| 5,687,254 | A | * | 11/1997 | Poon et al. | 382/229 |
| 5,710,831 | A | * | 1/1998 | Beernink et al. | 382/189 |
| 5,870,492 | A | * | 2/1999 | Shimizu et al. | 382/187 |
| 6,212,297 | B1 | * | 4/2001 | Sklarew | 382/189 |
| 6,493,464 | B1 | * | 12/2002 | Hawkins et al. | 382/189 |
| 6,661,409 | B2 | * | 12/2003 | Demartines et al. | 345/173 |
| 7,006,236 | B2 | * | 2/2006 | Tomasi et al. | 356/614 |
| 7,158,117 | B2 | * | 1/2007 | Sato et al. | 345/158 |
| 2002/0060669 | A1 | * | 5/2002 | Sze | 345/173 |
| 2002/0075240 | A1 | * | 6/2002 | Lieberman et al. | 345/170 |
| 2003/0067427 | A1 | * | 4/2003 | Comiskey et al. | 345/84 |
| 2003/0195976 | A1 | * | 10/2003 | Shiigi | 709/230 |
| 2004/0032399 | A1 | * | 2/2004 | Sekiguchi et al. | 345/173 |
| 2004/0160429 | A1 | * | 8/2004 | Blake et al. | 345/179 |
| 2004/0263483 | A1 | * | 12/2004 | Aufderheide | 345/173 |
| 2005/0025363 | A1 | * | 2/2005 | Lui et al. | 382/187 |
| 2005/0069205 | A1 | * | 3/2005 | Khomo | 382/187 |
| 2005/0180633 | A1 | * | 8/2005 | Williamson et al. | 382/187 |

OTHER PUBLICATIONS

Author: Camarda, Bill., Title: Using Microsoft Word 2002, Date: Jun. 2001, Publication: Indianapolis, Ind. : Que, 2001., Special Edition, p. 58,78.*

* cited by examiner

*Primary Examiner* — Andrew Wang
*Assistant Examiner* — David H Chu
(74) *Attorney, Agent, or Firm* — The Farrell Law Firm, P.C.

(57) ABSTRACT

Disclosed is a device and method for inputting characters or drawings on a mobile terminal using a virtual screen. To input characters or drawings through a virtual screen, the mobile terminal includes an electronic pen, a virtual screen generator, a position detector for detecting the electronic pen position, and a character recognition algorithm for recognizing a trail as a character. When a signal is input from the electronic pen, the mobile terminal detects the originating position of the signal and its trail. The mobile terminal recognizes the detected trail as a character and generates a virtual screen with the recognized character.

37 Claims, 9 Drawing Sheets

DEVICE AND METHOD FOR INPUTTING CHARACTERS OR DRAWINGS IN A MOBILE TERMINAL USING A VIRTUAL SCREEN

PRIORITY

This application claims priority to an application entitled "Device and Method for Inputting Characters or Drawings on Mobile Terminal Using Virtual Screen" filed with the Korean Intellectual Property Office on Sep. 25, 2004 and assigned Ser. No. 2004-77550, the contents of which are hereby incorporated by reference.

BACKGROUND OF THE INVENTION

1. Field of the Invention

The present invention relates to a mobile terminal, and more particularly to a device and method for inputting characters on a mobile terminal.

2. Description of the Related Art

Generally, a mobile terminal has a keypad provided with keys numbered 0 to 9 and symbol keys # and * to enable a user to input characters or numbers. Since the keypad has a limited number of keys, a plurality of characters are mapped on each key so that the user can input desired characters and numbers using the limited number of keys. The user can input a character by selecting a character input mode and pressing a corresponding key once or more times according to the order in which the character is imprinted on the key. Particularly, to input Korean characters (Hangul), the user has to repeatedly press keys until a desired character or syllable is created according to the writing system of Hangul.

A conventional method of inputting a special character or a symbol on a mobile terminal is to search for the special character or the symbol in a special character input mode and press a corresponding key. In other words, the user has to search for the desired special character or symbol and select it by pressing a corresponding key.

According to the conventional method, the user has to press keys until a desired character or syllable is created according to the writing system of the corresponding alphabet. To input a special character or a symbol, the user has to search for the character or the symbol through key-pressings, which is cumbersome and time-consuming.

Moreover, only the special characters and symbols previously stored in the mobile terminal can be searched and input. It is not possible to input any special character or symbol which has not been previously stored in the mobile terminal. Accordingly, there is a limitation in inputting every desired characters or symbols according to the conventional character input method.

SUMMARY OF THE INVENTION

Accordingly, the present invention has been made to solve the above-mentioned problems occurring in the prior art, and an object of the present invention is to provide a device and method for inputting characters or symbols on a mobile terminal, without causing inconvenience to input them through a keypad.

Another object of the present invention is to provide a device and method for inputting characters or symbols at high speeds on a mobile terminal, saving time taken to search for the characters or symbols and input corresponding keys.

Still another object of the present invention is to provide a device and method for easily inputting symbols or drawings that have not been previously stored in a mobile terminal.

In order to accomplish the above objects of the present invention, there is provided a device for inputting characters or drawings on a mobile terminal, including a user input means for sending input signals; a virtual screen generator for generating a virtual screen; a position detector for detecting originating positions of the input signals; and a control section for detecting trails corresponding to the originating positions of the input signals, outputting the detected trails to the virtual screen and storing information about the trails.

In accordance with another aspect of the present invention, there is provided a method for inputting characters or symbols on a mobile terminal, which includes the steps of generating a virtual word screen for inputting characters or symbols through a user input means sending input signals; when input signals are received, detecting originating positions of the input signals; detecting trails corresponding to the originating positions of the input signals; recognizing the trails as characters or symbols; and outputting the recognized characters or symbols to the virtual word screen.

In accordance with still another aspect of the present invention, there is provided a method for inputting a drawing on a mobile terminal, which includes the steps of generating a virtual drawing board for inputting a drawing through a user input means sending input signals; when input signals are received, detecting originating positions of the input signals; detecting trails corresponding to the originating positions of the input signals; recognizing the trails; and outputting the recognized trails to the virtual drawing board.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In addition, in the following description of the present invention, a detailed description of known functions and configurations incorporated herein will be omitted when it may make the subject matter of the present invention unclear.

The present invention provides a device and method for generating a virtual word screen in form of a notebook to enable a user to easily and rapidly input characters or symbols on a mobile terminal. The user can directly input characters or symbols on the generated virtual screen using an electronic pen emitting infrared rays or ultrasonic waves. Although a mobile terminal will be explained as an example, the present invention is applicable to any type of information terminals, including a smart phone or a PDA (Personal Digital Assistant).

Figure 1:
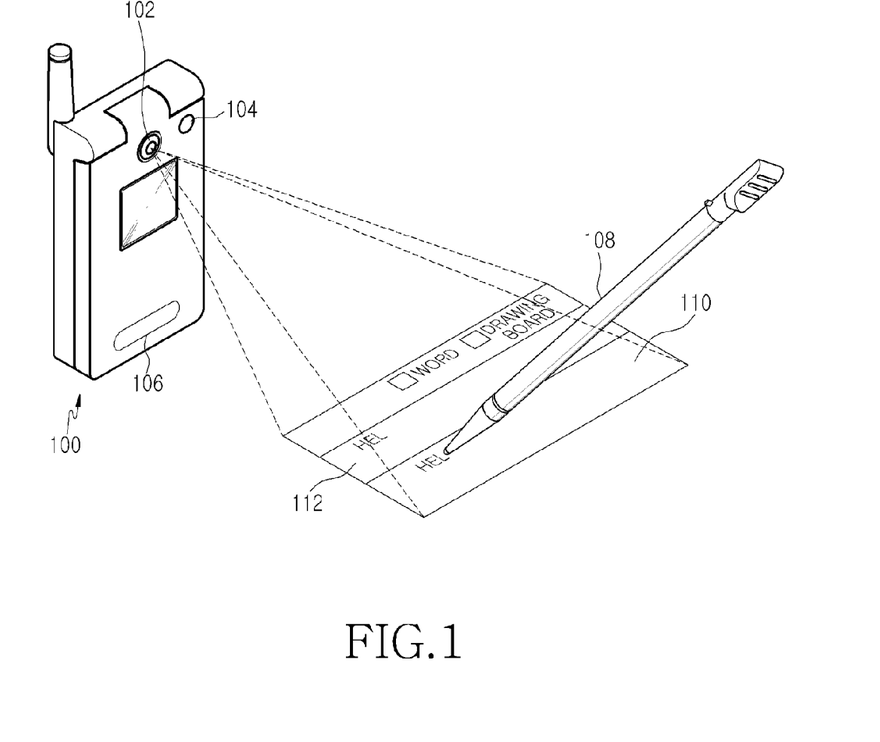
FIG. 1 is a view illustrating a mobile terminal according to the present invention.

FIG. 1 is a view showing a mobile terminal according to the present invention. Referring to FIG. 1, the mobile terminal 100 has a virtual screen generator 102 for generating a virtual screen including a user input window 110 and a preview window 112. When the virtual screen is generated, the user can write characters on the user input window 110 with an electronic pen 108 emitting infrared rays or ultrasonic waves. The infrared rays or ultrasonic waves emitted from the electronic pen 108 are monitored by a user input sensor 104 of the mobile terminal. Upon detecting an infrared or ultrasonic signal, the user input sensor 104 informs a position detector 106 of the detected signal. The position detector 106 then detects the originating position of the signal input from the electronic pen 108 through sensors provided therein. When detecting a trail of the signal generated according to the motion of the electronic pen 108, the virtual screen generator 102 includes the detected trail in the generated virtual screen so that the user can directly see the characters being input. The user's input, i.e., the trail left by the motion of the electronic pen 108, is recognized as characters by a control section of the mobile terminal 100. In addition, the recognized characters are output to the virtual screen generated by the virtual screen generator 102.

When the user writes desired characters on the virtual screen generated from the mobile terminal using the electronic pen 108, he or she can directly see the handwritten characters being input in the user input window 110. At the same time, the user can see the characters being reproduced in electronic form according to the trail left by the motion of the electronic pen 108. Thus, the user can easily and rapidly input desired characters or symbols on the mobile terminal by directly writing them on the virtual screen with the electronic pen 108.

Figure 2A:
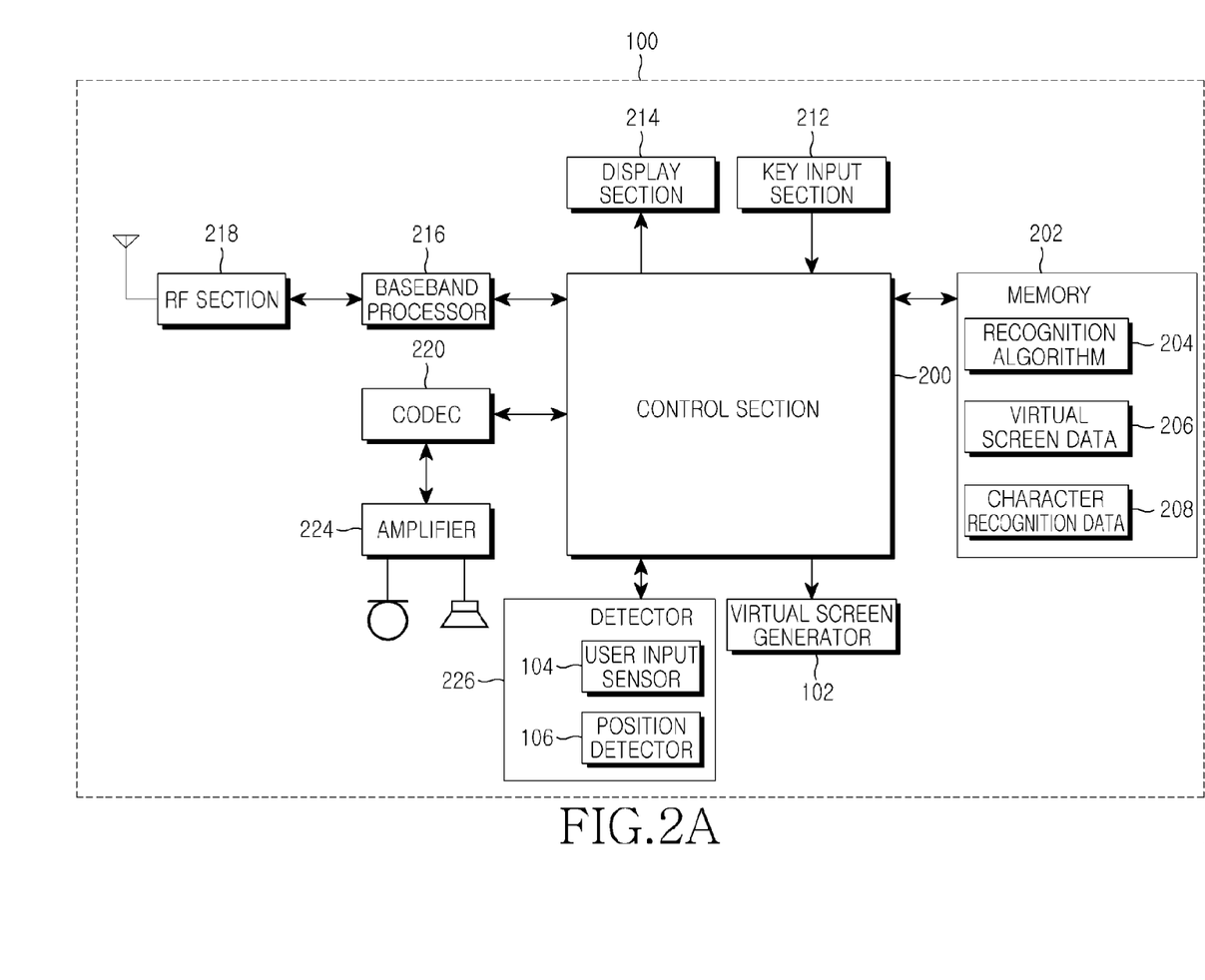
FIG. 2a is a block diagram illustrating the structure of a mobile terminal according to the present invention.
Figure 2B:
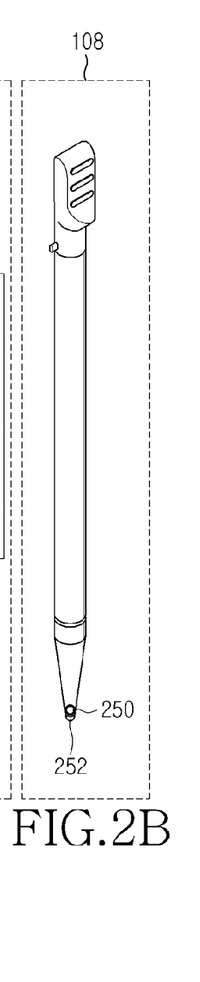
FIG. 2b is a view illustrating an input device useful for a virtual word screen according to the present invention.

FIG. 2a is a block diagram of a mobile terminal according to the present invention. FIG. 2b is an electronic pen according to the present invention. Referring to FIG. 2a, the mobile terminal includes a memory 202, a key input section 212, a display section 214, a baseband processor 216, an RF section 218, a codec (coder/decoder) 220, a detector 226 and a virtual screen generator 102 which are all connected to a control section 200. The control section 200 processes audio signals and data according to the protocols for telephone calls, data communication and wireless Internet access, and controls each part of the mobile terminal. Upon receiving a user's key input through the key input section 212, the control section 200 controls the display section 214 to generate image information corresponding to the user's key input. In addition, the control section 200 controls the virtual screen generator 102 to generate a virtual screen with the user input window 110 and the preview window 112 according to the user's selection. The control section 200 receives trail information corresponding to the position of the infrared rays or ultrasonic waves emitted from the electronic pen 108 as detected by the user input sensor 104 and the position detector 106, and recognizes the trails as characters using a character recognition algorithm 204 and character recognition data 208 stored in the memory 202. Then the control section 200 inputs the recognized characters to the virtual screen generator 102, thereby making the virtual screen generator 102 generate a virtual screen including the corresponding characters of the character recognition data 208.

The mobile terminal of the present invention has the virtual screen generator 102 for generating a virtual screen and the detector 226 for detecting and recognizing trails left by motion of the electronic pen 108. The virtual screen generator 102 comprises a beam projector, such as a laser diode, to generate a virtual screen. The detector 226 includes the user input sensor 104 for monitoring a user's input according to the presence or absence of an infrared or ultrasonic signal from the electronic pen 108, and the position detector 106 including at least one sensor for detecting the originating position of an input signal. The sensor provided in the position detector 106 should be an infrared sensor when the electronic pen 108 emits infrared rays or an ultrasonic sensor when the electronic pen 108 emits ultrasonic waves.

The memory 202 connected to the control section 200 comprises a ROM (Read Only Memory), a flash memory and a RAM (Random Access Memory). The ROM stores programs necessary for the processing and controlling operations of the control section 200 and various reference data. The RAM provides working memory for the control section 200. The flash memory stores various updatable data. The memory 202 according to the present invention stores a recognition algorithm 204 for analyzing a user's input from the control section 200, and recognizing trails left by the electronic pen 108. In addition, the memory 202 stores data 206 concerning a virtual screen generated by the virtual screen generator 102 and character recognition data 208 having characters corresponding to the recognized trails by the recognition algorithm 204.

The key input section 212 with a plurality of keys including number keys provides any key input by the user to the control section 200. The display section 214 generally comprises an LCD (Liquid Crystal Display) to display various information as images under the control of the control section 200. The RF section 218 sends and receives RF signals to and from a base station. The RF section 218 converts a received RF signal into an IF (intermediate frequency) signal and outputs the IF signal to the baseband processor 216. Also, the RF section 218 converts an IF signal input from the baseband processor 216 into an RF signal and sends the RF signal. As a BAA (Baseband Analog ASIC) that provides an interface between the control section 200 and the RF section 218, the baseband processor 216 converts a baseband digital signal applied from the control section 200 into an analog IF signal and applies the analog IF signal to the RF section 218. The baseband processor 216 converts an analog IF signal applied from the RF section 218 into a baseband digital signal and applies the digital signal to the control section 200. The codec 220 connected to the control section 200 is also connected to a microphone and a speaker through an amplifier 224. The codec 220 encodes audio signals input from the microphone through PCM (Pulse Code Modulation) and outputs the encoded audio data to the control section 200. In addition, the codec 220 encodes audio data received from the control section 200 through PCM and outputs the encoded data to the speaker. The amplifier 224 that amplifies audio signals input from the microphone or output through the speaker adjusts the speaker volume and the microphone gain under the control of the control section 200.

FIG. 2b shows an electronic pen useful to input characters or symbols according to the present invention. Referring to FIG. 2b, the electronic pen 108 has a signal transmitter 250 for transmitting an infrared or ultrasonic signal and a contact sensor 252 for activating the signal transmitter to transmit an infrared or ultrasonic signal when the tip of the electronic pen 108 contacts a plane. When the user writes a character or a symbol on a virtual screen with the electronic pen 108, the contract sensor 252 informs the signal transmitter 250 of the contact of the tip of the electronic pen 108 so that the signal transmitter 250 can transmit an infrared or ultrasonic signal. The contact sensor 252 can be a simple spring switch that can activate the signal transmitter 250.

As explained above, the mobile terminal 100 generates a virtual screen on which the user can write a character or a symbol with the electronic pen 108. The virtual screen outputs a trail corresponding to an infrared or ultrasonic signal transmitted from the electronic pen 108 while the character or symbol is being handwritten. At the same time, the character or symbol reproduced in printed or electronic format according to the trail is input to and displayed on the mobile terminal 108. Therefore, the user can input every desired character or symbol on the mobile terminal as if written on a notebook with a ball-point pen. The handwritten character or symbol is reproduced to a character or symbol in such a format as input using a word processor such as Hangul or MS Word.

Figure 3A:
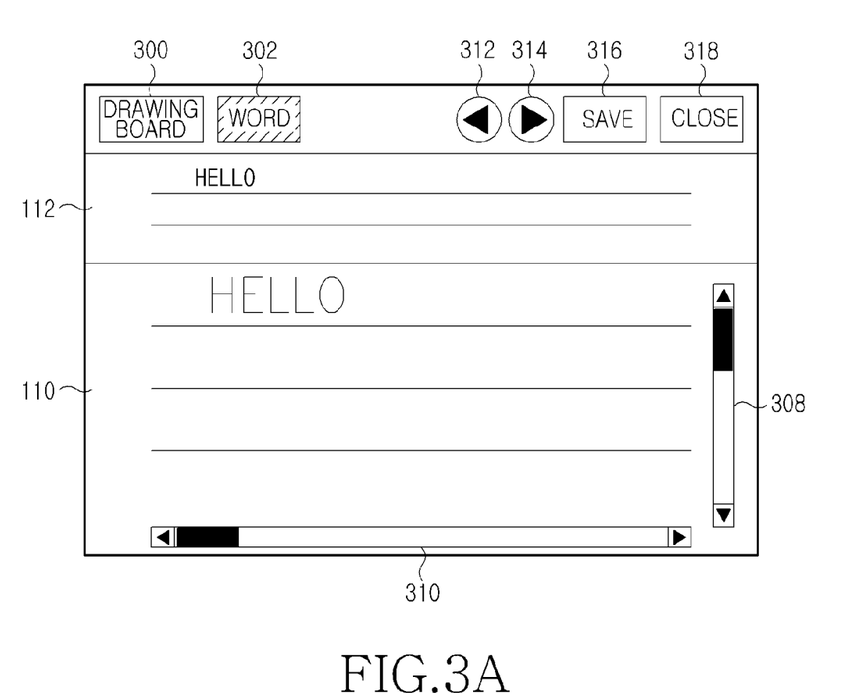
FIG. 3a is a view illustrating a virtual screen generated from a mobile terminal according to the present invention for entering text.
Figure 3B:
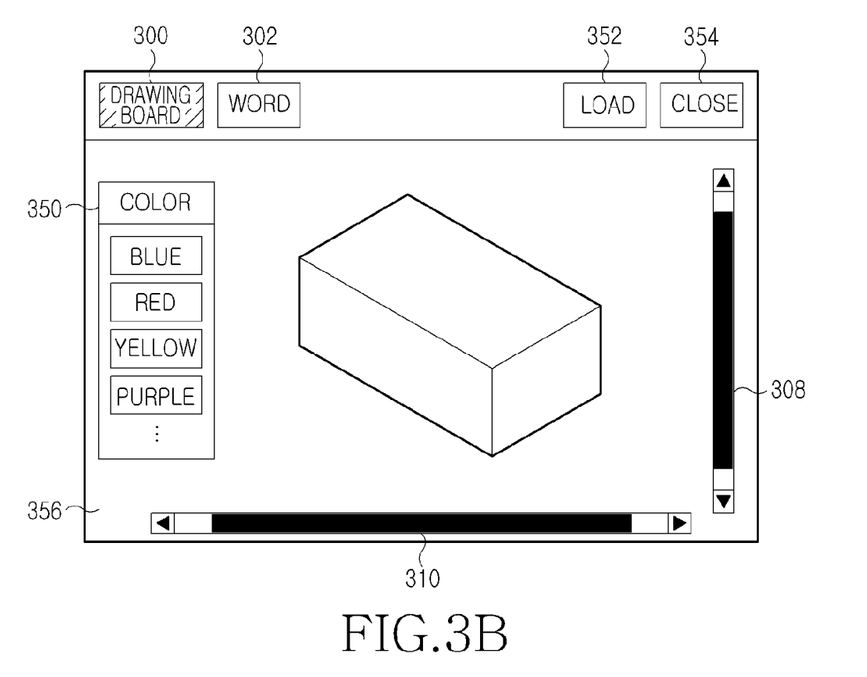
FIG. 3b illustrates a virtual screen for entering a drawing in accordance with an embodiment of the present invention.

FIGS. 3a and 3b show virtual screens generated from the mobile terminal according to the present invention. Referring to FIGS. 3a and 3b, the virtual screen includes, at the upper part thereof, a drawing board key 300 for generating a virtual drawing board to enable the user to draw and a word key 302 for generating a virtual word screen to enable the user to write characters or symbols. FIG. 3a shows a virtual word screen generated when the user selects the word key 302 to input characters or symbols. FIG. 3b shows a virtual drawing board generated by the selection of the drawing board key 300. The virtual word screen as shown in FIG. 3a can be in various forms. In a preferred embodiment of the present invention, it is assumed that the virtual word screen generated from the mobile terminal according to the present invention is in the form of a general notebook.

Referring to FIG. 3a, the virtual word screen includes the user input window 110 on which the user can directly write desired characters or symbols with the electronic pen 108 and the preview window 112 which outputs characters or symbols reproduced in printed or electronic form according to the handwritten characters or symbols, thereby enabling the user to directly confirm the input of the desired characters or symbols. The virtual word screen further includes a previous page key 312 and a next page key 314 at the upper part thereof to enhance user convenience. In addition, the virtual word screen includes a save key 316 for storing the input characters or symbols and a close key 318 for closing the virtual word screen. To move to a specific location on a page, the user can use a vertical scroll bar 308 and a horizontal scroll bar 310 provided at the bottom and right side of the virtual word screen. Accordingly, the user can directly confirm the input of the characters or symbols through the preview window 112 at the same time when writing them on the user input window 110. The user can move to a specific page at any time during the input of characters. Also, the user can easily move to a specific location on the current page using the scroll bars.

FIG. 3b shows a virtual drawing board generated by the selection of the drawing board key 300. Referring to FIG. 3b, the virtual drawing board includes a user drawing input window 356 on which the user can directly draw, a color selection menu 350 for selecting colors, a vertical scroll bar 308 and a horizontal scroll bar 310. The two scroll bars 308 and 310 are the same as shown in FIG. 3a. The virtual drawing board further includes a load key 352 for loading previously stored picture data and a close key 354 for closing the virtual drawing board with or without storing a drawing currently input in the drawing input window 356 according to the user's selection. In accordance with the present invention, the user can not only store a simple drawing with desired colors directly input using the electronic pen 108, but also load and modify any of previously stored drawings.

Figure 4:
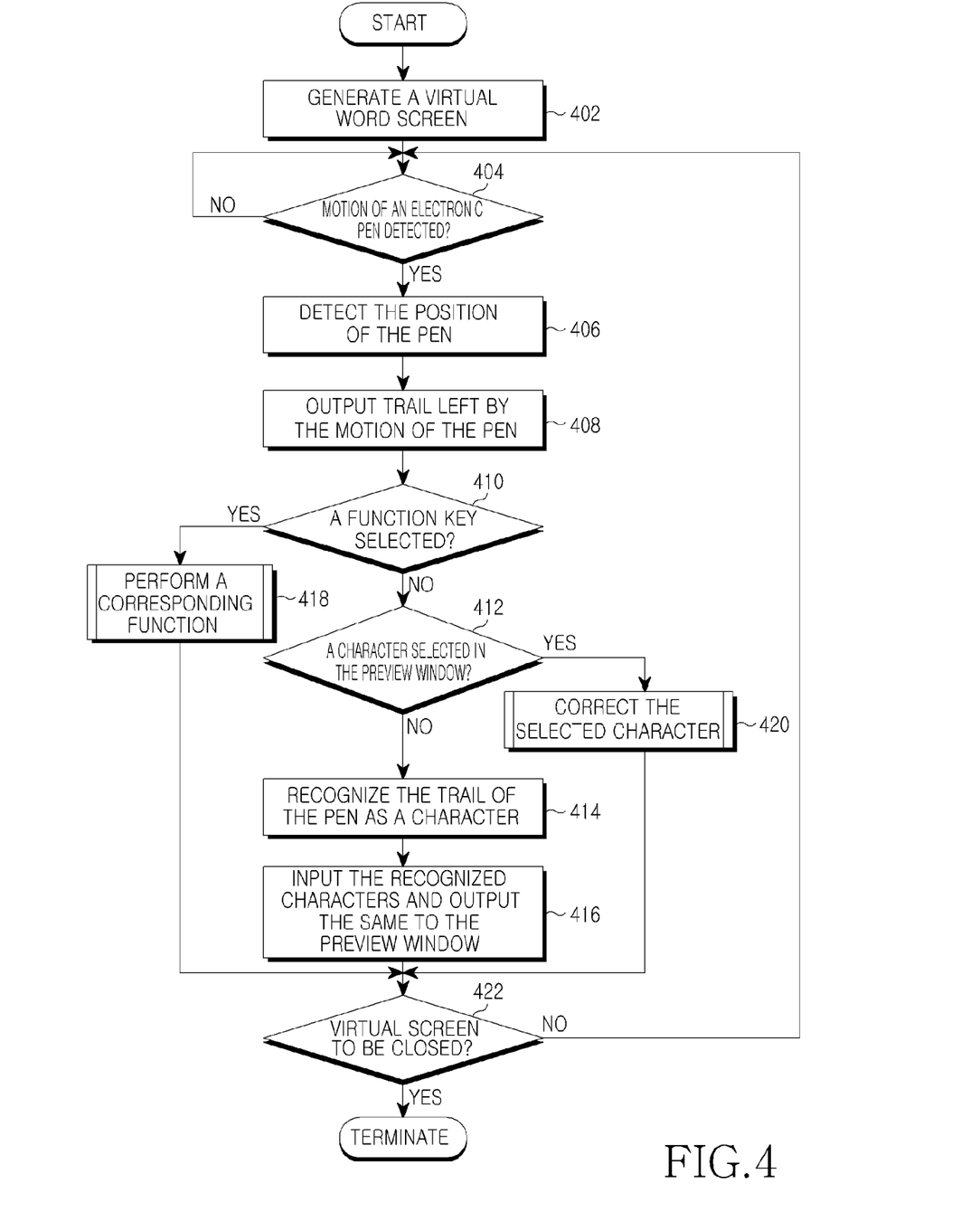
FIG. 4 is a flow chart illustrating a process of inputting characters on a mobile terminal using a virtual word screen according to the present invention.

FIG. 4 is a flow chart showing a process of inputting characters or symbols on the mobile terminal using a virtual word screen according to the present invention. Referring to FIG. 4, when the user selects the word key 302, the control section 200 proceeds with step 402 to generate a virtual word screen as shown in FIG. 3a. Upon generation of the virtual word screen (step 402), the control section 200 proceeds with step 404 to determine whether an infrared or ultrasonic signal transmitted from the electronic pen 108 is detected by the user input sensor 104. When the signal transmitted from the electronic pen 108 is detected (step 406), the position detector 106 detects the originating position of the signal, i.e., the position of the electronic pen 108. When the position of the electronic pen 108 is detected, the control section 200 detects a trail left by the motion of the electronic pen 108 and inputs the detected trail to the virtual screen generator 102 so that the trail can be output to the virtual word screen generated from the virtual screen generator 102 (step 408). At this time, the user may feel as if he or she writes characters or symbols with a ball point pen.

After outputting the trail left by the motion of the electronic pen 108 (step 408), the control section 200 determines whether the user has selected a function key at step 410. The function key refers to any of the previous page key 312, next page key 314, save key 316, close key 318 or 354 and load key 352 that can be selected by the user to perform a specific function. If the control section 200 determines that the user has selected a function key using the electronic pen 108 at step 410, it will proceed with step 418 to perform a function corresponding to the selected function key. Step 418 will be explained in detail with reference to FIG. 5.

If the control section 200 determines that the user has not selected a function key at step 410, it will proceed with step 412 to check whether one of the characters output through the preview window 112 is selected according to the trail of the electronic pen 108 on the user input window 110. If one of the characters output through the preview window 112 is selected at step 412, the control section 200 will proceed with step 420 to perform an operation to correct the selected character. Step 420 of correcting a character will be explained in detail with reference to FIGS. 6 and 7.

If no character output through the preview window 112 is selected at step 412, the control section 200 will proceed with step 414 to compare the trail of the electronic pen 108 that has been input to the user input window 110 with the character recognition data 208 according to the character recognition algorithm 204. The control section 200 will then proceed with step 416 to output the recognized characters or symbols to the preview window 112 and display them as the user's input. Also, the control section 200 confirms whether the virtual screen generation process is to be terminated (step 422). If the user selects the close key to close the current virtual screen at step 422, the control section 200 will terminate the process of generating the virtual screen and recognizing the trail input by the user with the electronic pen 108 as characters or symbols. If, instead, the user does not close the virtual screen at step 422, the process returns to step 404 and repeats the above process until the user closes the virtual screen at step 422.

Figure 5:
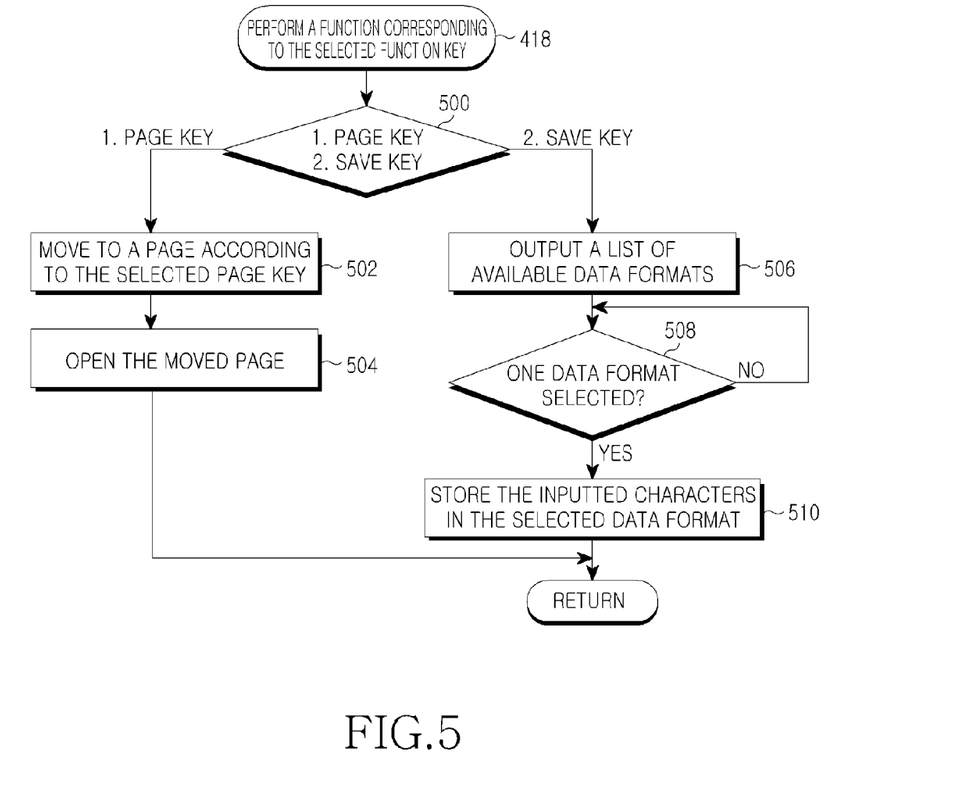
FIG. 5 is a flow chart illustrating a process of performing a function on a mobile terminal as selected by a user according to the present invention.

FIG. 5 is a flow chart illustrating the process of performing a function corresponding to a function key selected by the user (step 418 in FIG. 4). Referring to FIG. 5, when the user selects a specific function key using the electronic pen 108 (step 418), the control section 200 determines what function corresponds to the selected function key at step 500. Although a larger number of function keys can be provided on the virtual screen, several functions implemented by selecting keys such as the page keys 312 and 314 and save key 316 will be explained with reference to FIG. 5. If the user selects either of the page keys 312 or 314, the control section 200 will move to a previous or next page. To be specific, if the user selects the previous page key 312 at step 502, the control section 200 will move to the page previous to the currently opened one. If the user selects the next page key 314, the control section 200 will move to a new page or the page next to the current one. At step 504, the control section 200 opens the previous or next page as selected by the user. Then the control section 200 proceeds with step 422 in FIG. 4 to determine whether the user has selected the close key to close the virtual screen.

If the user selects the save key 306 on the virtual word screen at step 500, the control section 200 will proceed with step 506 to output a list of data formats in which the input characters or text can be stored (for example, TXT (.txt), MS Word (.doc) and Hangul (.hwp)). Also, the control section 200 checks which data format was selected by the user at step 508. When the user selects one of the data formats listed at step 506, the control section 200 proceeds with step 510 to store the currently input characters in the selected data format. Then the control section 200 proceeds with step 422 in FIG. 4 to determine whether the user has selected the close key to close the virtual word screen.

Figure 6:
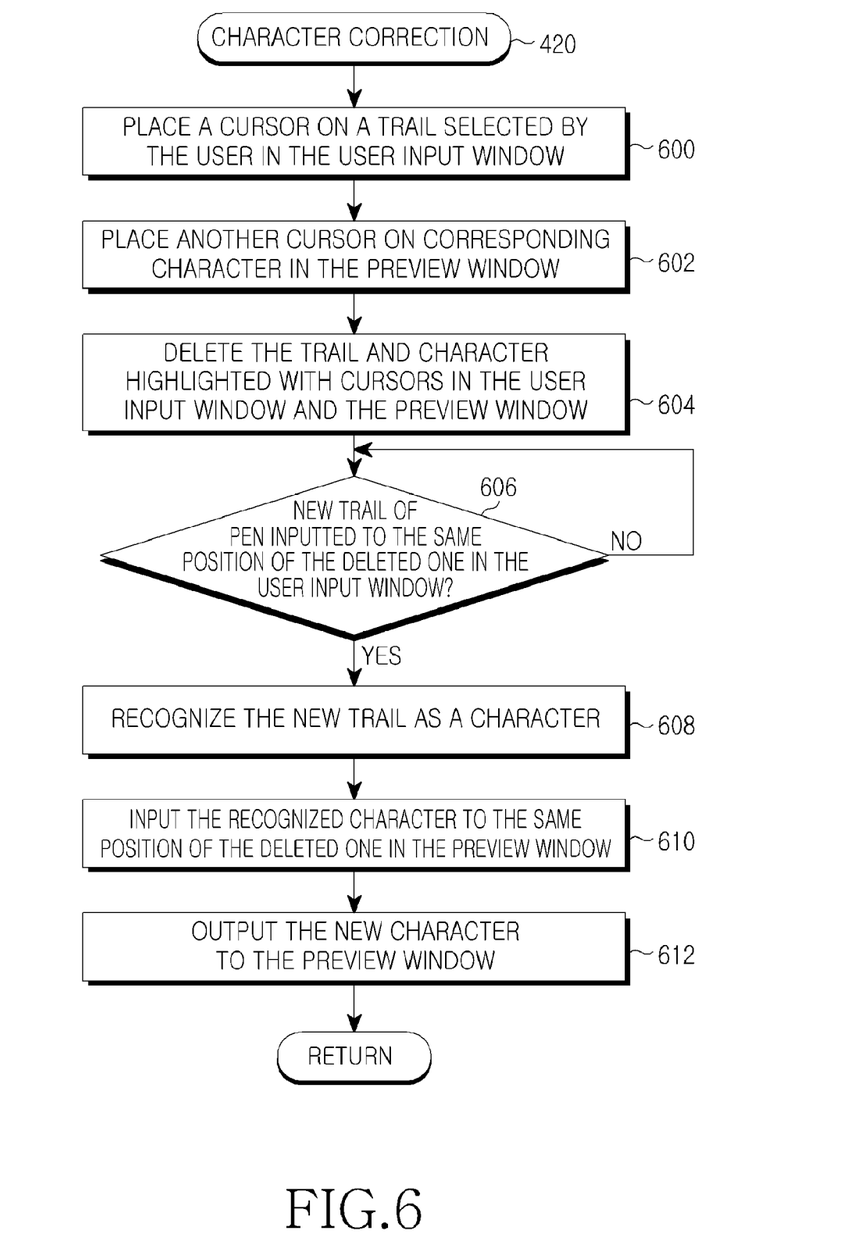
FIG. 6 is a flow chart illustrating a process of correcting a character input by a user on a mobile terminal according to the present invention.

FIG. 6 is a flow chart showing the process of correcting a character input by the user (step 420 in FIG. 4). Referring to FIG. 6, when the user selects one of the characters output through the preview window 112 by pointing the electronic pen 108 on the same character handwritten on the user input window 110 at step 412 in FIG. 4, the control section 200 will proceed with step 420 to perform an operation to correct the selected character. Specifically, at step 600, the control section 200 places a cursor on the character selected by the user with the electronic pen 108 in the user input window 110. At step 602, the control section 200 also places a cursor on the corresponding character output through the preview window 112. At step 604, the control section 200 deletes the characters with cursors placed thereon in the user input window 110 and the preview window 112.

Subsequently, the control section 200 proceeds with step 606 to check whether the user inputs a new character using the electronic pen 108 in the same position where the erroneous character was deleted. The input using the electronic pen 108 refers to a trail left by the motion of the electronic pen 108 when the user writes a specific character with the electronic pen 108. Upon detecting the input of a trail, i.e., a signal transmitted from the electronic pen 108, the control section 200 proceeds with step 608 to recognize the character corresponding to the trail of the electronic pen 108 input at step 606 based on the character recognition data 208 and the recognition algorithm 204. At step 610, the control section 200 inputs the recognized character to the position of the erroneous character highlighted with the cursor and deleted in the preview window 112. At step 612, the control section 200 outputs the character input at step 610 to the position of the erroneous character deleted in the preview window 112 so that the user can confirm the correction of the erroneous character.

Figure 7A:
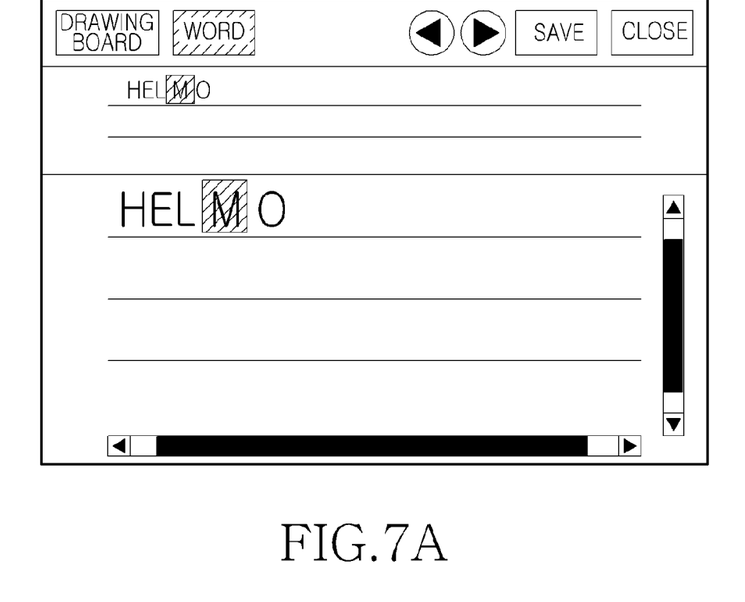
FIG. 7a is a view illustrating an error selected from characters input by a user on a mobile terminal according to the present invention.
Figure 7B:
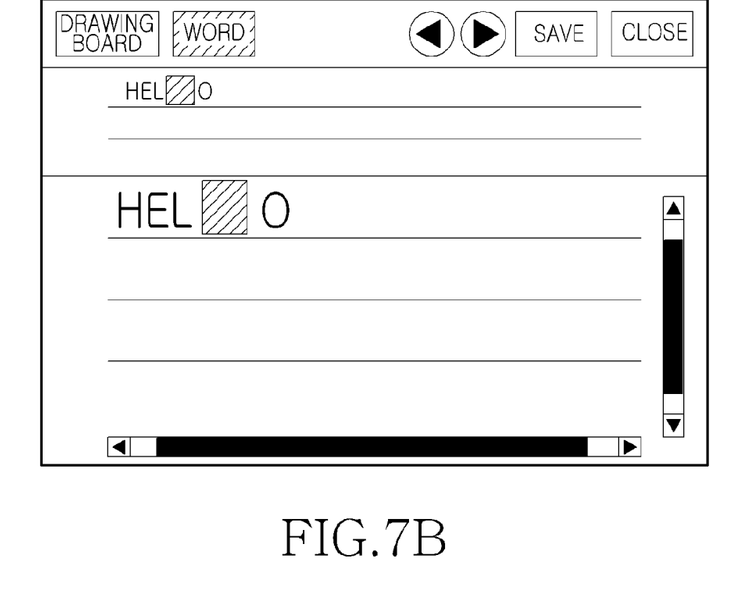
FIG. 7b is a view illustrating the deletion of an error included in characters input by a user on a mobile terminal according to the present invention.
Figure 7C:
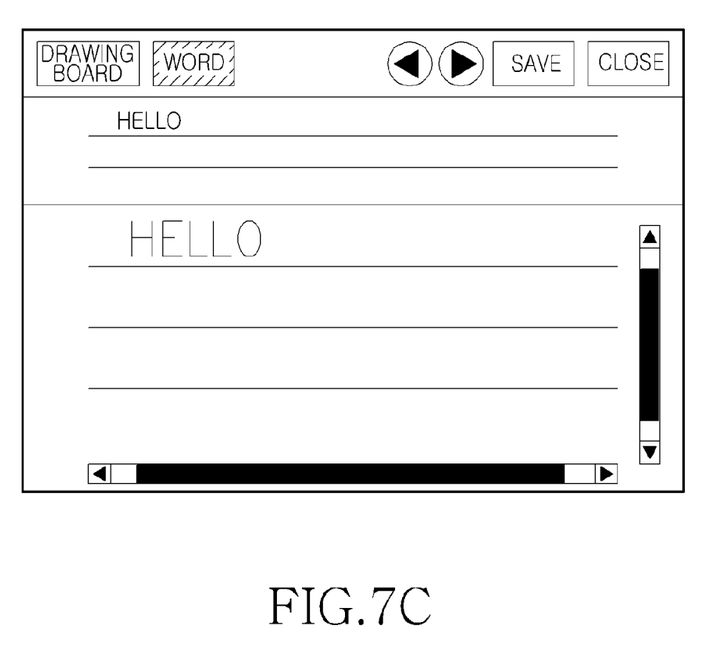
FIG. 7c is a view illustrating the correction of an error included in characters input by a user on a mobile terminal according to the present invention.

FIGS. 7a to 7c show the virtual screens used during the process of correcting a character according to the flow chart of FIG. 6. FIG. 7a is a view showing an erroneous character selected by placing a cursor at steps 600 and 602 in FIG. 6. FIG. 7b is a view showing the deletion of the erroneous character highlighted with the cursor at step 604. FIG. 7c is a view showing the correction of the erroneous character through steps following step 604. Referring to FIGS. 7a to 7c, when the user writes a wrong character with the electronic pen 108, he or she can delete the wrong character and input a new correct one. The user can see the characters being input as handwritten and correct any error in the input characters immediately upon detecting the error.

Figure 8:
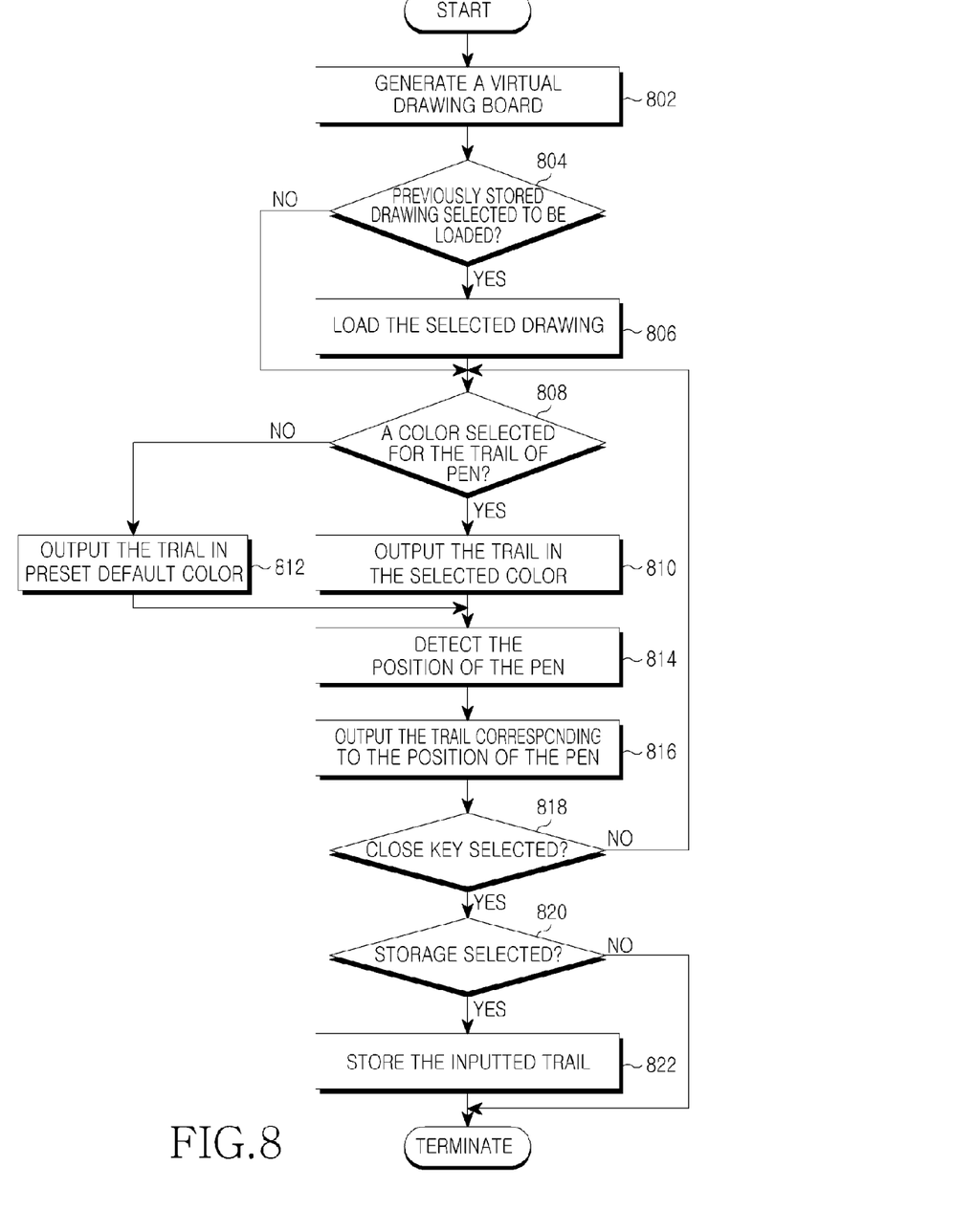
FIG. 8 is a flow chart illustrating a process of inputting a drawing on a mobile terminal using a virtual drawing board according to the present invention.

FIG. 8 is a flow chart showing the operation of the control section 200 when the user selects the drawing board key 300 to generate a virtual drawing board as shown in FIG. 3b. When the virtual screen is generated, the user can select the drawing board key 300. Upon the selection of the drawing board key 300, the control section proceeds with step 802 to generate a virtual drawing board. Then the control section 200 proceeds with step 804 to determine whether the user has selected the load key 352. If the load key 352 is selected, the control section 200 will proceed with step 806 to load a drawing selected by the user from the previously stored drawings and output the selected drawing to the virtual drawing board. Subsequently, at step 808, the control section 200 checks whether the user has selected a specific color for a trail of the electronic pen 108.

If the load key 352 is not selected at step 804, the control section 200 will proceed directly with step 808 to check whether the user has selected a color for the trail of the electronic pen 108. If a specific color is selected, the control section will input the color data to the virtual screen generator 102 so that the trail input by the user with the electronic pen 108 can be output in the selected color. If no specific color is selected at step 808, the control section 200 will output the trail of the electronic pen 108 in a preset default color. After the selection of color, the control section 200 proceeds with step 814 to detect the position of the electronic pen 108, i.e., the trail left by the motion of the electronic pen 108. At step 816, the control section 200 outputs the detected trail of the electronic pen 108 in a color selected by the user. At step 818, the control section 200 confirms whether the user has selected the close key 354. If the close key 354 is not selected, the control section 200 will repeat steps 808 through 818. If the close key 354 is selected at step 818, the control section 200 will proceed with step 820 to determine whether the trail input by the user with the electronic pen 108 is to be stored as picture data. If the user selects the close of the virtual drawing board after storing the current drawing, the control section 200 will proceed with step 822 to store the trail input by the user on the virtual drawing board using the electronic pen 108 in an image file format (for example, BMP, GIF or JPEG) and will then terminate the process of generating the virtual drawing board and outputting the trail input by the user with the electronic pen 108. If the user does not select the storage of the current drawing at step 820, the control section 200 will terminate the process of generating the virtual drawing board and outputting the trail input with the electronic pen 108 and will close the virtual drawing board without storing the input trail. In accordance with the present invention, the user can input simple drawings, as well as symbols or characters, on a mobile terminal using a virtual screen.

As explained above, the present invention provides a method and device for inputting characters or drawings on a mobile terminal using a virtual screen. To enable the user to directly input characters or drawings through a virtual screen, the mobile terminal comprises an electronic pen emitting either infrared rays or ultrasonic waves according to the user's selection, a virtual screen generator for generating a virtual screen, a position detector for detecting a signal input from the electronic pen and an originating position of the detected signal, and a character recognition algorithm and character recognition data for recognizing a trail corresponding to the position detected by the position detector as a character. When a signal is input from the electronic pen, the mobile terminal detects the originating position of the signal and the trail corresponding to the originating position. Also, the mobile terminal recognizes the detected trail of the electronic pen as a character and generates a virtual screen including the recognized character. Accordingly, the present invention enables the user to input characters or symbols at high speeds on the mobile terminal, without the inconvenience of using a keypad. In addition, the user can freely input symbols or simple drawings that have not been previously stored in mobile terminal keypads.

Although preferred embodiments of the present invention have been described for illustrative purposes, those skilled in the art will appreciate that various modifications, additions and substitutions are possible, without departing from the scope and spirit of the invention. In the above description of the present invention, it has been explained that an error in characters input by the user can be corrected by selecting and deleting the error in the preview window and inputting a correct character in the same position of the error deleted. However, various methods can be used to correct an erroneously input character. For example, an electronic pen having a function similar to a pencil with an eraser on its top can be used in the present invention. Such an electronic pen has a tip emitting specific infrared rays or ultrasonic waves for inputting characters and an opposite top emitting different infrared rays or ultrasonic waves for erasing an input character. When an infrared or ultrasonic signal emitted from the top of the electronic pen is detected, the control section of the mobile terminal can operate to delete the character corresponding to the position of the detected signal.

In addition, although a mobile terminal has been explained as an example, the present invention is applicable to any type of information terminals, including a smart phone or a PDA (Personal Digital Assistant). Although not mentioned above, a support plate can be used to enable the virtual screen generator to generate a virtual screen always in a specific angle. Accordingly, various modifications, additions and substitutions can be made to the present invention, without departing from the scope and spirit of the invention as disclosed in the accompanying claims, including the full scope of equivalents thereof.

What is claimed is:

1. A device for inputting characters or drawings on a mobile terminal, the device comprising:
    a user input means for transmitting input signals;
    a virtual screen generator for generating a virtual screen and for generating a virtual word screen including a preview window and a user input window;
    a position detector for detecting originating positions of the transmitted input signals on the virtual screen; and
    a control section for detecting trails corresponding to consecutive originating positions of the input signals by movement of the user input means to display the detected trails in the preview window, and recognizing the detected trails as characters or symbols to display the recognized characters or symbols in the user input window;
    wherein the virtual word screen comprises page keys for moving to a page selected by a user; and
    wherein detecting trails comprises moving to a page previous or next to a current page of the preview window and the user input window when one of the page keys is selected;
    wherein said virtual screen generator comprises at least one beam projector or laser diode.

2. The device as claimed in claim 1, further comprising a user input sensor for detecting the input signals and inputting the detected signals to the control section.

3. The device as claimed in claim 1, wherein said user input means includes a signal transmitter for transmitting any of infrared signals and ultrasonic signals.

4. The device as claimed in claim 1, wherein said control section outputs the trails and the recognized characters or symbols to the virtual screen.

5. The device as claimed in claim 1, wherein said position detector comprises at least one sensor for detecting the originating position of an input signal.

6. The device as claimed in claim 1, further comprising a memory for storing character recognition data including characters and symbols, a recognition algorithm used to recognize the trails corresponding to the originating positions of the input signals detected by the position detector as characters or symbols of the character recognition data, and virtual screen data used to generate a virtual screen from the virtual screen generator.

7. The device as claimed in claim 3, wherein said user input means further includes a switch for driving the signal transmitter.

8. The device as claimed in claim 7, wherein said switch is a contact sensor capable of detecting a contact.

9. The device as claimed in claim 1, wherein said user input means is in a pen shape.

10. The device as claimed in claim 9, wherein said user input means further includes a transmitter for transmitting any of infrared signals and ultrasonic signals and a contact sensor for detecting a contact.

11. The device as claimed in claim 10, wherein said user input means has the contact sensor at a tip thereof to drive the transmitter when detecting a contact.

12. The device as claimed in claim 1, wherein said virtual screen includes:
    a word key for generating the virtual word screen to enable a user to input characters or symbols with the user input means; and
    a drawing board key for generating a virtual drawing board to enable the user to draw with the user input means.

13. The device as claimed in claim 12, wherein said virtual word screen is in a form of an opened notebook.

14. The device as claimed in claim 12, wherein said virtual word screen includes:
    a user input window for receiving trails corresponding to the originating positions of the signals input by the user with the user input means; and
    a preview window for outputting characters or symbols recognized as corresponding to the trails.

15. The device as claimed in claim 14, wherein said virtual screen generator outputs the trails to the user input window so that the user can directly confirm the input of the trails.

16. The device as claimed in claim 12, wherein virtual word screen further includes a horizontal scroll bar and a vertical scroll bar to move to a specific location on a page.

17. The device as claimed in claim 14, wherein said virtual word screen further includes a save key for storing characters output to the preview window in a data format selected by the user.

18. The device as claimed in claim 17, wherein said data format includes TXT and MS Word.

19. The device as claimed in claim 12, wherein said virtual drawing board includes:
 a user drawing input window for inputting trails with the user input means; and
 a color selection menu for selecting a color of the trails.

20. The device as claimed in claim 19, wherein said virtual drawing board further includes a load key for loading previously stored picture data.

21. The device as claimed in claim 19, wherein said virtual drawing board further includes a horizontal scroll bar and a vertical scroll bar to move to a specific location on the drawing board.

22. A method for inputting characters or symbols on a mobile terminal, the method comprising the steps of:
 generating a virtual word screen including a preview window and a user input window for inputting characters or symbols through a user input means for transmitting input signals;
 when transmitted input signals are received, detecting originating positions of the transmitted input signals;
 detecting trails corresponding to consecutive originating positions of the input signals by movement of the user input means to display the detected trails in the preview window;
 recognizing the detected trails as characters or symbols; and
 outputting the recognized characters or symbols in the user input window;
 wherein the virtual word screen comprises function keys including page keys for moving to a page selected by a user; and
 wherein detecting trails comprises moving to a page previous or next to a current page of the preview window and the user input window when one of the page keys is selected; wherein said virtual screen generator comprises at least one beam projector or laser diode.

23. The method as claimed in claim 22, wherein said detection of trails includes outputting the detected trails in a form visible to the user.

24. The method as claimed in claim 22, wherein said virtual word screen includes:
 a user input window for inputting the trails as characters or symbols with the user input means; and
 a preview window for outputting the characters or symbols recognized as corresponding to the trails.

25. The method as claimed in claim 24, wherein the function keys further comprise:
 a save key for storing the characters or symbols output to the preview window.

26. The method as claimed in claim 23, wherein said output of the detected trails includes outputting the trails to the user input window.

27. The method as claimed in claim 23, wherein said output of the detected trails includes outputting the characters or symbols recognized as corresponding to the trails to the preview window.

28. The method as claimed in claim 25, wherein said detection of trails further includes:
 when one of the function keys is selected, performing a function corresponding to the selected function key.

29. The method as claimed in claim 28, wherein said performance of a function includes:
 when the save key is selected, outputting a list of available data formats and storing the characters or symbols output to the preview window in a data format selected by the user.

30. The method as claimed in claim 24, wherein said detection of trails further includes:
 when one of the characters or symbols output to the preview window is selected by the user with a trail of the user input means, correcting the selected character or symbol.

31. The method as claimed in claim 30, wherein said correction of the selected character or symbol includes:
 placing a cursor on the selected character or symbol in the preview window;
 placing another cursor on the trail corresponding to the selected character or symbol in the user input window;
 deleting the character or symbol and trail highlighted with the cursors in the preview window and the user input window;
 inputting a new trail to the same position of the deleted trail in the user input window when a new signal is transmitted from the user input means;
 recognizing the new trail as a new character or symbol; and
 inputting the recognized new character or symbol to the same position of the deleted one in the preview window and outputting the newly input character or symbol to complete the correction.

32. A method for inputting a drawing on a mobile terminal, the method comprising the steps of:
 generating a virtual drawing board with a preview window and a user drawing input window for inputting a drawing through a user input means for transmitting input signals;
 when the transmitted input signals are received, detecting originating positions of the transmitted input signals;
 detecting trails corresponding to consecutive originating positions of the transmitted input signals; and
 outputting the detected recognized trails in the user drawing input window,
 wherein the virtual drawing board comprises page keys for moving to a page selected by a user, and
 wherein detecting trails comprises moving to a page previous or next to a current page of the preview window and the user drawing input window when one of the page keys is selected; wherein said virtual screen generator comprises at least one beam projector or laser diode.

33. The method as claimed in claim 32, wherein said output of the trails includes selecting a color of the trails.

34. The method as claimed in claim 32, wherein said virtual drawing board includes a load key for loading previously stored picture data.

35. The method as claimed in claim 34, wherein said generation of a virtual drawing board includes:

when a previously stored drawing is loaded, generating the virtual drawing board with the loaded drawing.

36. The method as claimed in claim 32, further comprises the step of storing the trails input to the virtual drawing board in an image file format.

37. The method as claimed in claim 36, wherein said image file format includes at least one of BMP, JPEG and GIF.

* * * * *